United States Patent [19]

Burns

[11] Patent Number: 5,129,096
[45] Date of Patent: Jul. 7, 1992

[54] SYSTEM WHICH ROUTES RADIO TRANSMISSIONS TO SELECTED REPEATERS FOR RETRANSMISSION

[75] Inventor: Christopher A. Burns, Wetherby, United Kingdom

[73] Assignee: Tunstall Telecom Limited, Yorkshire, England

[21] Appl. No.: 518,457

[22] Filed: May 4, 1990

[30] Foreign Application Priority Data

May 12, 1989 [GB] United Kingdom ............... 8910997

[51] Int. Cl.$^5$ ............................................. H04B 7/14
[52] U.S. Cl. ....................................... 455/18; 455/9; 455/33.1; 455/54.1
[58] Field of Search .......................... 455/8, 9–11, 455/13, 15, 16, 18, 33, 51, 53, 54, 56; 340/825.5; 375/3, 4

[56] References Cited

U.S. PATENT DOCUMENTS

| | | |
|---|---|---|
| 4,255,814 | 3/1981 | Osborn .................................. 455/51 |
| 4,347,626 | 8/1982 | Wenzel .................................. 455/18 |
| 4,475,246 | 10/1984 | Batlivala et al. ..................... 455/18 |
| 4,479,245 | 10/1984 | Batlivala et al. ..................... 455/18 |
| 4,680,583 | 7/1987 | Grover .......................... 340/825.52 |
| 4,701,935 | 10/1987 | Namiki ................................. 375/4 |

FOREIGN PATENT DOCUMENTS 0013316 7/1980 European Pat. Off. .
0086865 8/1983 European Pat. Off. .
3210298 9/1983 Fed. Rep. of Germany .

OTHER PUBLICATIONS

English language abstract of DE-A-32 10 298.
Woodworth, "A Total Highway Communications System Using $F_1$-$F_1$ Repeaters", IEEE Transactions on Vehicular Technology, vol. VT-19, No. 1, Feb. 1970, pp. 69–73, New York, US.

Primary Examiner—Reinhard J. Eisenzopf
Assistant Examiner—Chi H. Pham
Attorney, Agent, or Firm—Darby & Darby

[57] ABSTRACT

A radio transmission system designed to operate on a single defined frequency channel. The system comprises a central receiver (12), at least one transmitter (14) remote from the receiver and a plurality of repeaters (13) arranged in zones (Z1 to Zn) around the receiver. Each repeater can receive a signal from a transmitter and re-transmit the message so that it eventually reaches the receiver by way of one or more repeaters. The system includes protection means for protecting the message against loss or corruption, for example by using unique time delays before re-transmission or by addressing a certain sequence of repeaters with alternate paths being provided to guard against the message being lost.

19 Claims, 3 Drawing Sheets

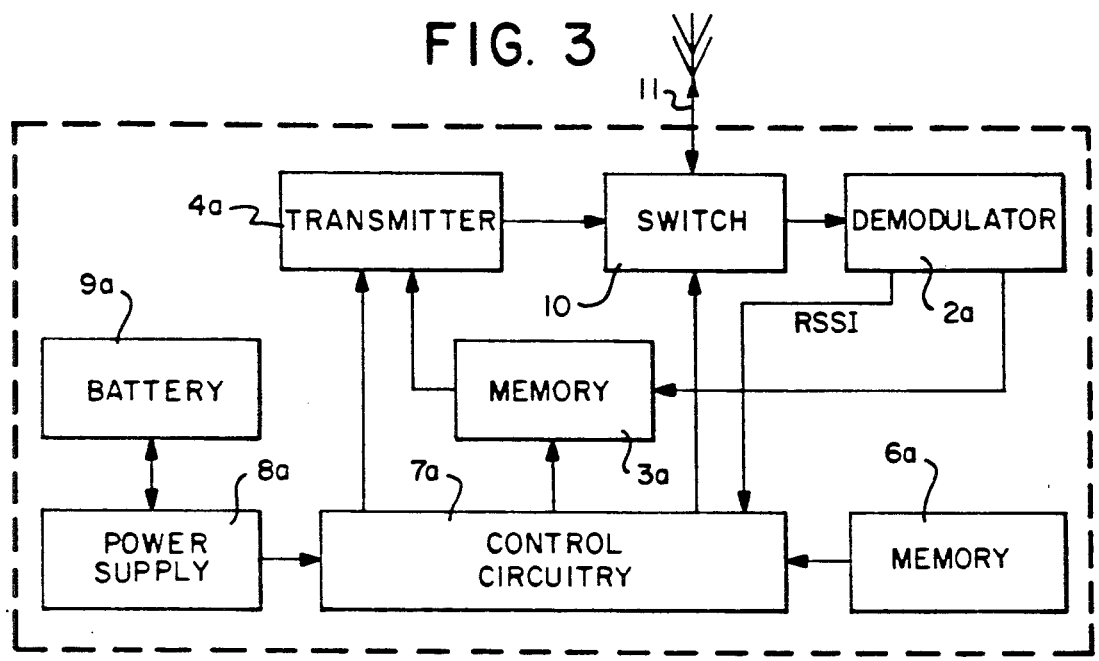
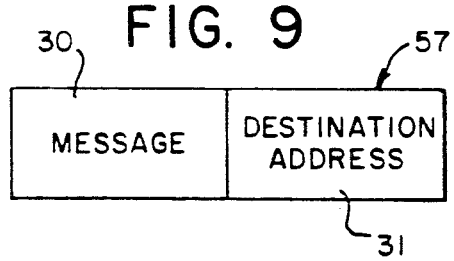
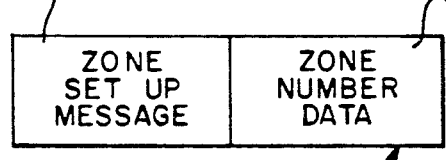
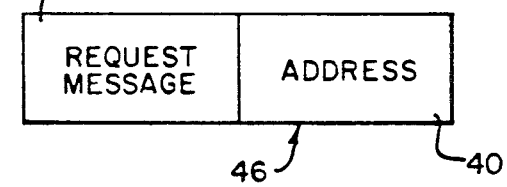
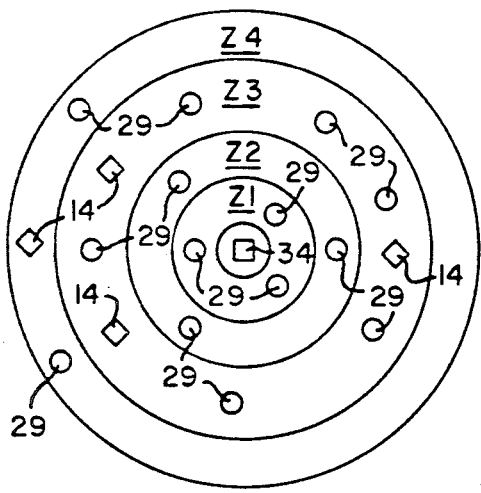
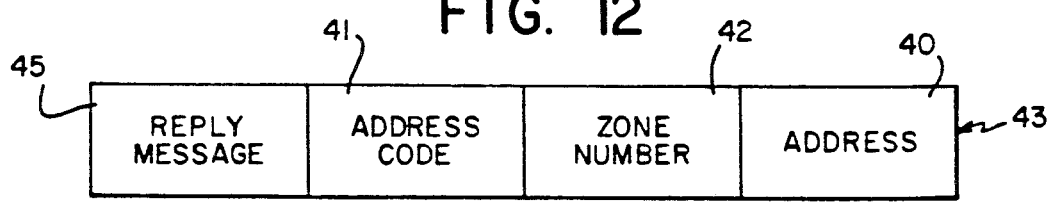

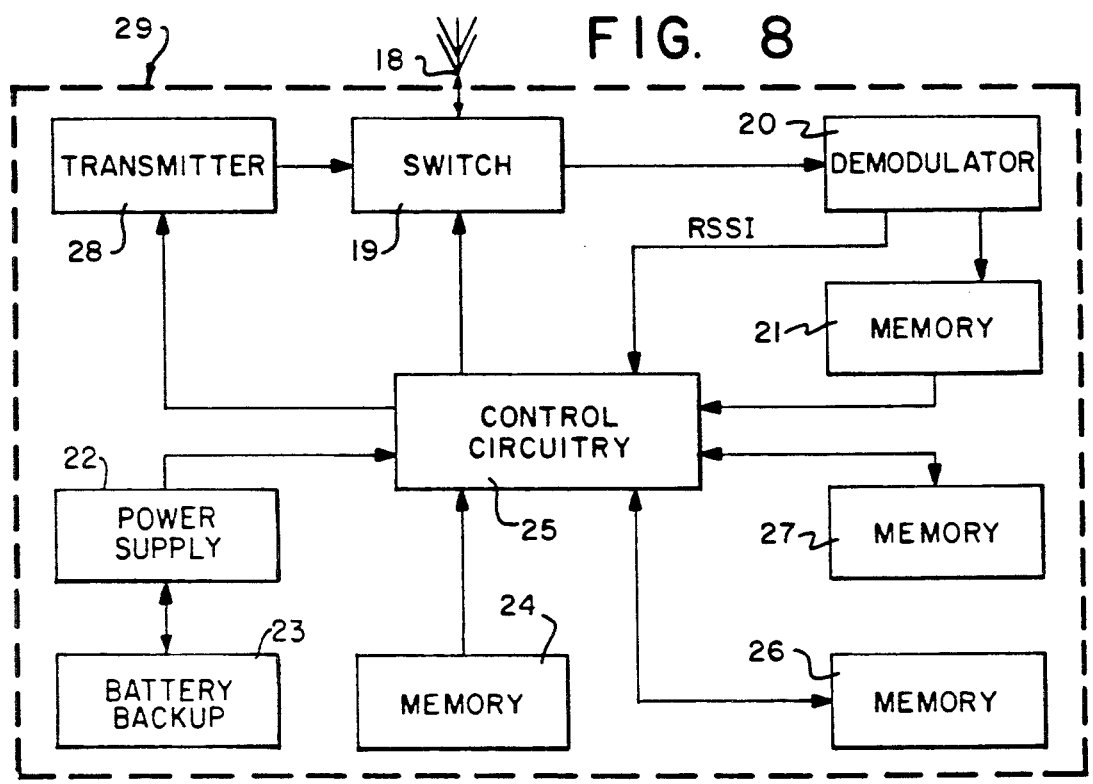
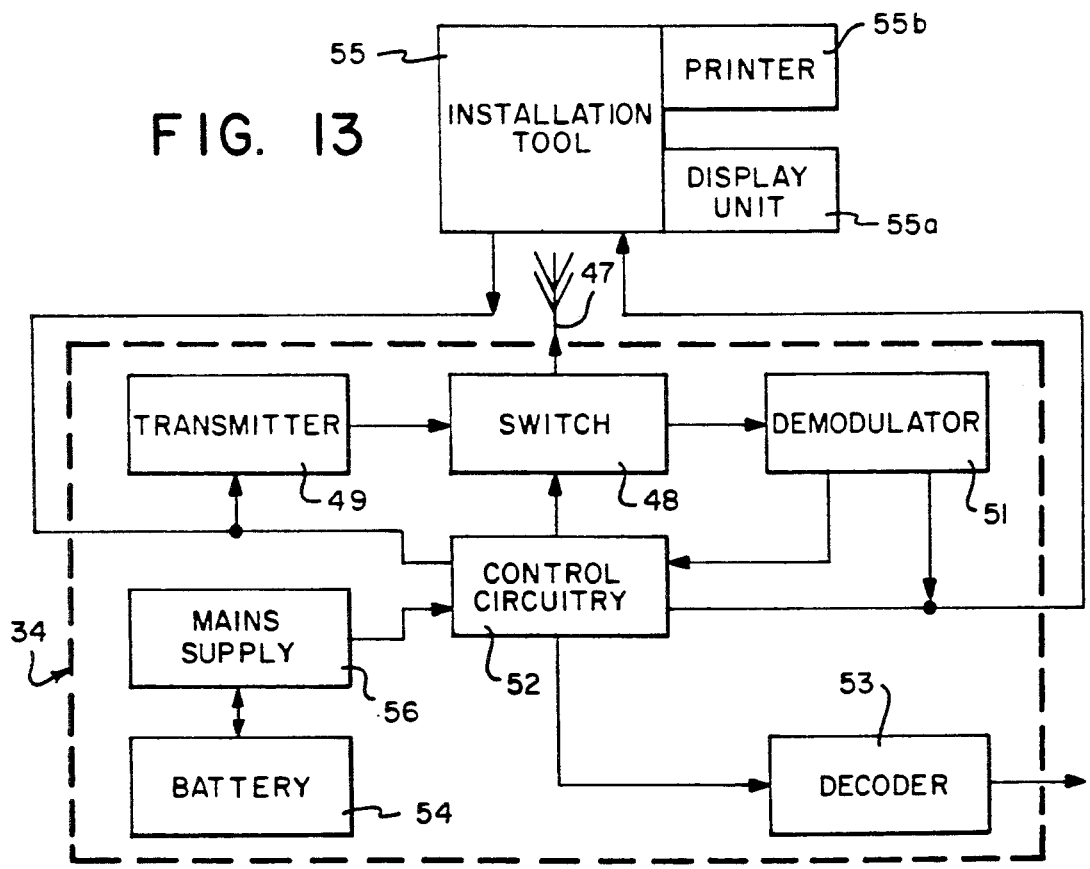

SYSTEM WHICH ROUTES RADIO TRANSMISSIONS TO SELECTED REPEATERS FOR RETRANSMISSION

The present invention relates to a radio transmission system in which messages sent by a transmitter are picked up by a central receiver via a number of repeaters.

The invention is particularly concerned with low power radio transmissions using a single frequency, since low power radio transmitters and their associated receivers are licence-exempt, provided that they operate on a single defined channel (which may be in the HF, VHF or UHF band), the transmitter output power is restricted to a low level, and the radio system operates on a single site.

Such low power, licence-exempt devices are commonly used to send binary data messages for various purposes, such as telemetry, telecontrol and telecommand applications, for identification tagging and increasingly for "in-building" and "on-site" wireless security systems.

The main disadvantages of these low power licence-exempt radio systems is their low operational range due to the low level of permitted transmitter output power. Attempts have been made to overcome this disadvantage by using radio repeaters to relay messages from outlying transmitters to a central receiver, but these have generally not been successful because the messages from the repeaters and the transmitters share the same frequency channel and may clash. Hence, there is an increased risk of traffic contention and subsequent loss or corruption of messages.

The present invention seeks to overcome this difficulty, whilst retaining the advantage of greater operational range resulting from the use of repeaters.

According to the present invention there is provided a radio transmission system designed to operate on a single defined frequency channel, the system comprising a central receiver, at least on transmitter remote from the central receiver and, located between said receiver and transmitter, a plurality of repeaters each adapted to receive a message from a transmitter or from another repeater and to retransmit said message to the receiver either directly or via at least one other repeater, in which the system includes protection means associated with the repeaters for protecting said message against loss or corruption during transmission of said message from said transmitter to said receiver.

Preferably the protection means comprises means for preventing simultaneous transmission of said message by two or more repeaters.

In one embodiment of the invention each repeater includes delay means for imposing a time delay between receipt of said message by said repeater and re-transmission of said message by said repeater, the time delay associated with each repeater being unique to that repeater.

Thus, the unique time delay of each repeater prevents a message received by more than one repeater from being re-transmitted exactly simultaneously, thereby avoiding loss of the message due to traffic contention.

The unique time delay can be pre-set using data in a further electronic memory of the repeater, or alternatively using switches or potentiometers.

Conveniently, the repeaters are arranged in zones around the central receiver, each repeater including the zone address number such that the repeaters closest to the central receiver are designated "zone 1", and those furthest away from the central receiver have the highest zone number.

With such a system of zoned repeaters, when a transmitter sends a message, it is received by one or more repeaters and/or the central receiver. The message is stored in the repeater for the unique time delay, and the zone number information of that repeater is added to the message, which is then re-transmitted. This re-transmitted message (including the zone number information) is received by one or more repeaters and/or the central receiver, but a repeater with a zone number equal to or greater than that in the received message does not process the message further. Any repeater with a lower zone number overwrites the zone number information in the message with its own zone number and re-transmits the message after its own pre-set unique time delay.

In another embodiment of the invention each repeater has a unique identification address, memory means storing a list of identification addresses relating to those repeaters within its range and control means operative to cause the repeater to re-transmit said message to a first identification address on said list and, in the event that said re-transmitted message is not received or is incorrectly received by the first addressed repeater, to re-transmit said message again, but to a second identification address on said list.

Advantageously, the address list would be arranged in order to proximity to the central receiver, i.e. the addresses of those repeaters closest to the central receiver are at the top of the list.

Preferably, the control means directs the re-transmitted message first to the repeater address at the top of the list, monitors the channel until it receives the message repeated by the addressed repeater, and, in the event that does not receive the message which should have been repeated by the addressed repeater, redirects the message to the second address on the list, and so on until the addressing repeater finally receives confirmation that its message has been received.

Clearly, each time a message is repeated it will be received by other repeaters as well as the specific repeater to which the message is addressed, but only the addressed repeater processes the message any further.

This system of "intelligent" repeaters may be used in conjuction with the pre-set time delay and/or interrogation means provided in the first aspect of the invention, and is particularly suited to larger sites with a large number of repeaters.

Typically, the repeaters would each be defined as belonging to a particular zone, as in the first aspect of the present invention.

Preferably, the system includes a rechargeable battery back-up facility which ensures operation of the repeaters should there be a mains failure.

Conveniently, if mains fails to a repeater, that repeater automatically transmits a message, after its own unique pre-set time delay, to alert the central receiver of the mains failure. Thus, the pre-set unique time delay also serves to prevent traffic contention in the event that mains failed generally to all the repeaters on site.

Embodiments of the present invention will now be described, by way of example only, with reference to the accompanying drawings in which:

FIG. 3 is a block diagram of an alternative repeater;

FIG. 7 illustrates schematically a typical site on which is installed a radio transmission system according to a second aspect of the invention;

FIG. 8 is a block diagram of a repeater forming part of the system illustrated in FIG. 7;

FIG. 9 represents a repeated message from the repeater of FIG. 8;

FIG. 10 represents a zone set up message used during installation of the system of FIG. 7;

FIGS. 11 and 12 represent repeater destination set up messages using during installation of the system of FIG. 7; and FIG. 13 is a block diagram of the central receiving station forming part of the system of FIG. 7.

Figure 1:
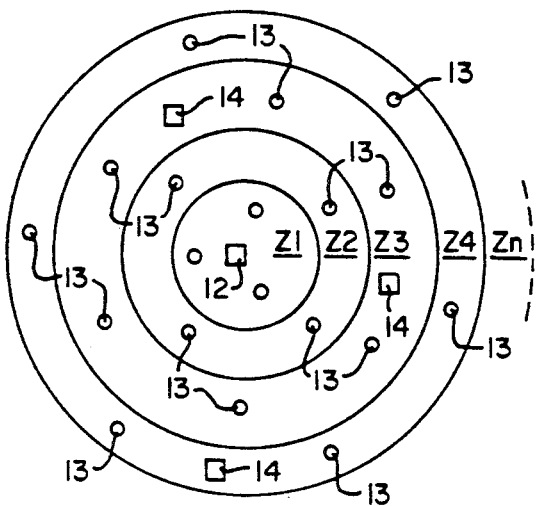
FIG. 1 illustrates schematically a typical site on which is installed a radio transmission system according to a first aspect of the invention.

In an embodiment according to a first aspect of the present invention, a site as shown in FIG. 1 has located therein a central receiver 12, transmitters 14 and repeaters 13. The site is divided into a number of zones, Z1, Z2, Z3 ... Zn, and the repeaters in each zone are assigned zone address numbers related to their zone. The repeaters in zone 1 are nearest to the central receiver and those furthest away from the central receiver have the highest zone number.

Figure 2:
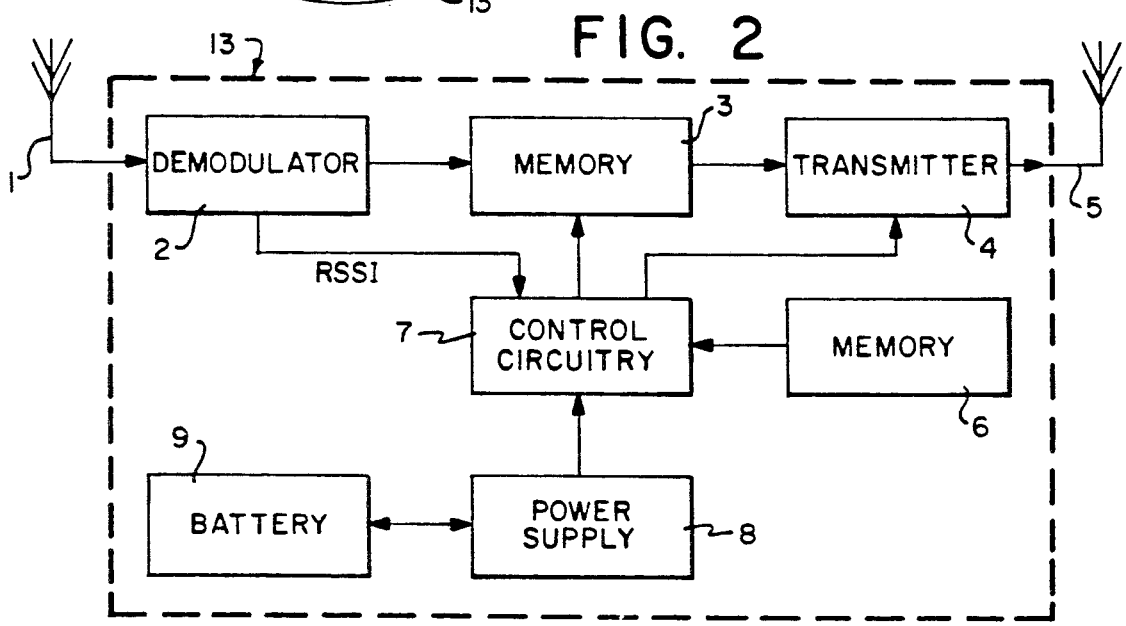
FIG. 2 is a block diagram of a repeater forming part of the system illustrated in FIG. 1.

One type of repeater is illustrated in FIG. 2, and comprises a receiver aerial 1, transmitter aerial 5, receiver and demodulator 2, data message memory 3, transmitter 4, zone address memory 6, electronic control circuitry 7, mains power supply 8 and a rechargeable battery 9.

The aim of the system is to relay messages which are originated by a transmitter 14, via a number of repeaters 13, to the central receiver 12. This is achieved as follows.

Binary data message are originated by transmitters 14 which may be at fixed positions on the site or may be mobile units carried by people or live stock or attached to objects which are moved around the site.

Figure 4:
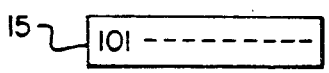
FIG. 4 represents a transmitted message from a transmitter forming part of the system illustrated in FIG. 1.

FIG. 4 shows a message from transmitter 14, which will consist of n bits of binary data 15, including error correction bits if required. The message will be received by one or more repeaters 13 and/or the central receiver 12. When the message is received by a repeater, the message is received and demodulated by receiver and demodulator 2, then is stored in electronic memory 3 for a pre-set time controlled by electronic circuitry 7 and unique to that particular repeater. An additional m bits of data 16a are added to the message 15 to convey the repeater's zone number information. These m bits of zone number information may be stored in the zone address memory 6, or alternatively may be set during installation using switches, wire links etc, or silimar means.

Figure 5:
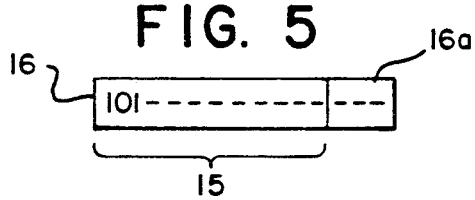
FIG. 5 represents a repeated message from the repeater of either FIG. 2 or FIG. 3.

The receiver and demodulator 2 sends a "received signal strength indication" or RSSI to the control circuitry 7 to allow the repeater to ensure that there is no traffic on the channel within its own range before re-transmitting the message after the pre-set time delay. If the channel is clear, i.e., if the received signal strength indicator does not detect traffic on the channel, then the message is re-transmitted by transmitter 4 through aerial 5. The message 16 which is transmitted (see FIG. 5) is exactly the same as the original received message 15 with the zone number 16a added.

This repeated message is then received by one or more repeaters 13 and/or the central receiver 12. Any repeater with a higher zone number or equal zone number to the zone number in the received message does not process the message any further. Repeaters with a lower zone number store the message in memory and overwrite the zone number with their own lower zone number before re-transmitting (if the channel is clear) as described above. Thus, messages are passed by repeaters towards the central receiver 12, where the process stops.

As has been previously mentioned, repeated messages 16 are delayed before being transmitted. The purpose of this delay is to prevent a situation where a message received by more than one repeater is re-transmitted exactly simultaneously causing the loss of the message due to traffic contention. The delay can be set using data in a further electronic memory, or alternatively using switches, potentiometers or similar means, and each repeater on the site is set with a different delay during installation.

In the case of mains failure, the repeater units continue to operate using the rechargeable battery 9. When the mains supply to a repeater fails, the repeater automatically transmits a mains fail message 17 (see FIG. 6) (after a pre-set delay) to alert the central receiver station of the mains failure. The pre-set delay is necessary to prevent traffic contention if mains fails generally on site to all the repeaters. To reduce the risk of contention further, repeaters operating on battery back-up may be programmed not to re-transmit a mains failure message, but simply to send an acknowledgement signal to the originating repeater.

Figure 6:
FIG. 6 represents a mains fail message.

The mains fail message 17 will consist of a repeater identity 47, a mains fail message 49 and the zone address 48 as shown in FIG. 6. The mains fail message 17 has a similar format to the repeated message 16, but the binary data 15 and 16a is replaced by the repeater identity code 47 and the mains fail message 49. The repeater identity 47 may be set in an electronic memory or using switches. It is also possible that the switches described above, which set the pre-set transmit delay, could define the repeater identity.

As an alternative to the repeater of FIG. 2 that shown in FIG. 3 may be used; components of FIG. 3 similar to those of FIG. 2 are shown by the same reference numeral, with the suffix a. The repeater of FIG. 3 differs on that it uses a common transmit and receive aerial 11, and in that the control circuitry 7 controls a transmit/receive switch 10.

The system of "zoned repeaters" and "site zones" as above described overcomes the problem of low transmitter operational range, which limits site size, and coverage area can be increased idefinitely by adding further zones. The problems of traffic contention are reduced by the pre-set time delays in the repeaters which prevents those repeaters which received the same message from re-transmitting simultaneously, and also by the use of the RSSI output from the receiver 2 which is used to ensure that the channel is clear before transmission. The received signal strength indicator can be generated using the signal level at the receiver intermediate frequency, as is the case for RSSI on commercially available receiver integrated circuits, or alternatively the data protocol can be designed to enable simple detection of on-channel traffic. For example, if data messages are split into groups of bits separated by relatively long periods where unmodulated carrier is transmitted, then these long periods of "no data" and "no noise" out of the demodulator can be detected using appropriate electronic circuitry to indicate traffic on the channel.

The drawback in this system arises as the number of repeaters on the site increases and as the site size increases, since a detailed site survey is required in order to define the repeater positions and zone boundaries which may cover irregular shapes due to propagation effects, and also the requirement on installation to program the repeater zone numbers, retransmit delays and identity codes.

In the system according to a second aspect of the invention, illustrated schematically in FIG. 7, individual repeaters 29 (each as illustrated in FIG. 8) have the repeater address uniquely set at manufacture and stored in repeater address memory 24 before despatch to the site. These pre-addressed repeaters are installed on site without regard to this address. Each repeater also includes a transmit/receive aerial 18, a transmit/receive switch 19, a receiver and demodulator 20, a message memory 21, a power supply 22, a battery backup 23, control circuitry 25, a destination address memory 26, a zone number memory 27 and a transmitter 28.

When all repeaters are positioned, the central receiver/transmitter 34 is operated to transmit a set up message 35 (see FIG. 10) which consists of a "zone set up message" (i.e. a series of data bits which are defined to alert any receiving equipment that a set up message follows), and zone number data 37 (the data in this case being 0, since the central receiver/transmitter is defined as the sole occupant of zone O). This set up messssage is generated by an installation tool 55 (see FIG. 13) and is transmitted by transmitter 49 in the central station via switch 48 and transmit/receive aerial 47. The installation tool may be a personal computer using software which generates standard messages and decodes replies, or alternatively can be dedicated equipment or part of the central station hardware. The central station also includes decoder circuitry 53, a rechargeable battery 54, mains supply 56, a receiver and demodulator 51 and control circuitry 52.

Any repeater 29 within range of the central receiver/transmitter which receives this set up message 35 defines itself as an occupant of zone 1 and this zone number information is stored in memory 27 (see FIG. 8).

After a pre-set delay (different for each repeater) which may be random or may be derived electronically from the unique repeater address, each of these zone 1 repeaters transmits a repeater zone set up message which is similar to message 35 with the exception that the zone number 37 information is now set to zone 1.

Any repeaters within range and which receive this message define themselves as zone 2 (unless they have previously been defined as zone 0 or zone 1), and this set up procedure continues until all repeaters have defined themselves as part of a zone.

If the operational range of a repeater link is marginal, it is possible that messages could be received during set up but could occasionally be lost after the system has been commissioned. In order to prevent this, the received signal strength indication from the receiver is used to define a lower acceptable limit for received signal strength during the set up procedure.

If the signal is not above this limit, the control circuitry 25 of each repeater prevents the receiving repeater from defining itself as part of the higher zone. Alternatively, if an RSSI is not available from the type of receivers being used, then the transmitter power should be reduced to a fraction of the normal transmitter power in order to build in a safety margin.

When all the repeaters which receive a zone set up message 35 have defined themselves as part of a zone, there is a further time delay after which the repeaters transmit their addresses and zone numbers back via other repeaters to the central receiver. This information is displayed by a display unit 55a or printed by a printer 55b of installation tool 55. At this stage, the installation team can note which repeaters have not replied, i.e. those which are out of range of all other repeaters, and can then site additional repeaters as required. This zone set up procedure is repeated until all repeaters are defined as an occupant of a zone. The repeater destination addresses are then set up as follows.

Using the installation tool 55, each repeater is instructed to transmit a repeater destination set up request 46 (see FIG. 11) which consists of a standard request message 39 and its own address 40 which any receiving repeaters recognise as a repeater destination set up request. Any repeater which receives this message then transmits a repeater destination set up reply 43 (see FIG. 12), consisting of a standard "reply message" 45, its address code 41, zone number 42 and the address of the requesting repeater 40.

These reply messages are sent afer a delay in order to prevent several repeaters replying instantaneously, again the delay can be random or derived from the repeater address information. The reply messages 43 include the requesting repeater's address in order to direct the message to the correct repeater. The requesting repeater receives messages from any replying repeaters, and compiles a list of neighboring repeaters which are in-range. This list is compiled in zone order, those with lowest zone number (ie nearest to the central receiver) first. Any replying repeaters which have the same zone number are listed in reply order, but this is not important to the operation of the system. If desired, the order of destination repeaters listed with in the same zone may be periodically amended by the repeater control circuitry, based on a statistical monitoring of failed transmissions for each destination repeater. These destination addresses are stored in memory 26 of the repeater.

This repeater destination set up procedure is initiated by the installer using the installation tool 55 to send a message from the central station transmitter which is received by all repeaters (possibly via other repeaters) and is recognised as an instruction to initiate the destination set up procedure. After a delay, each repeater retransmits the initial message without modification, then after a further delay each repeater transmits its destination request message 46.

After all repeaters have transmitted their repeater destination set up request messages 46 and stored all repeater destination set up replies 43, each repeater will hold in its memory 26 a list of other in-range repeaters' addresses and their corresponding zone numbers. At this stage, the installer sends a "list addresses" message from the central station transmitter using the installation tool which instructs all repeaters (which may receive the instruction via other repeaters) to transmit a list of the destination addresses in memory 26. Each repeater receives this "list addresses" instruction, and after a delay retransmits it on to other repeaters, then after a further delay it transmits data containing its own address and a list of destination addresses.

A full list of all repeater addresses and their destination addresses is compiled and displayed using the installation tool 55. All repeaters should have at least two repeaters in this list. If any do not, then the installer can install further repeaters. Thus, the installation procedure is considerably simplified since only the transmitter 14 to repeater 29 propagation needs to be considered in detail. The repeater to repeater path can be considered using a approximate "typical" range and sited on this basis and any holes in repeater to repeater coverage are automatically discovered and made apparent to the installer at either the zone set up stage or the destination set up stage.

Installation may thus be summarized as follows:

1. The site for the central receiver/transmitter 34 is defined.
2. Repeaters 29 are sited in order to cover the areas of the site furthest from the central station which contain transmitters 14. This stage will require consideration of the transmitter to repeater range.
3. Further repeaters are sited between the central station 34 and the previously sited outlying repeaters. These repeaters may be sited using approximate repeater to repeater range.
4. The central station transmits a zone set up message which is relayed on by other repeaters until all repeaters are either part of a zone or are not set up since they are out of range.
5. After a further delay all repeaters which have zone numbers transmit their address and zone number which is relayed back to the central receiver. At this stage any repeaters not set up are noted by the installers who can then install fill-in repeaters, to bring them within range.
6. Steps 4 and 5 are reiterated until all repeaters are part of a zone.
7. The installer sends out a message from the central station instructing all repeaters to set up their destination address lists.
8. After a delay all repeaters request neighboring repeaters to reply with their addresses and zone numbers.
9. The installer sends a message instructing all repeaters to respond with a list of their destination addresses. Each repeater should have a list of at least 2 destinations. Once this is achieved, the installation procedure is complete.

System operation is as follows:

When a message 30 is transmitted by a transmitter 14 that message 30 is received by one or more repeaters which then format a message 57 as shown in FIG. 9.

The destination address 31 is that which is top of the list of destination addresses ie, that which is nearest to the central station. This message is then retransmitted and is received by one or more neighboring repeaters, but only the repeater with the specified address will process the data any further.

The addressed repeater then places the destination address code from the top of its own list in the message which is then retransmitted. This new message will be received by neighboring repeaters including the previous repeater which monitors the channel until it receives this message which acts as confirmation that the message has been received correctly. This process is continued until the message is received by the central receiver where the repetition stops. Clearly it is desirable that path loss between repeaters is equal in both the transmit and the receive direction. It is therefore preferred to use a common Tx/Rx aerial on each repeater.

If a previous repeater fails to receive its message acknowledgement from the next repeater in the chain then it selects the second address on its list of destination addresses and repeats the message for a second time.

Thus if a repeater fails to retransmit the message for any reason, for example if a receiver has become faulty or if a shield is temporarily placed between repeaters in the signal path then the message is intelligently redirected via another repeater.

Before any repeater transmits a message it monitors the channel for traffic (using the RSSI from its receiver for example) to ensure that the channel is clear of other transmissions before transmitting data itself, thus reducing the possibility of traffic contention. If a message has been contended with and has been corrupted then the receiving repeater detects this since the error check bits will be incorrect. The receiving repeater then transmits a "message corrupted" message to the original repeater, which would be monitoring for receipt of an acknowledgement signal in the form of a repetition of its own message. Receipt of "message corrupted" message rather than the acknowledgement signal initiates a retransmission of the original message. If the mains supply fails to a repeater then the repeater transmits a message to the central station to indicate that it is operating on battery back-up.

Thus, the system of intelligent repeaters and site zones provides a system which allows site size to be increased with a very low probability of traffic contention and a very high probability that messages are received by the central station accurately and quickly. The system is designed to make the commissioning of repeaters a simple task which can be performed by a single installer operating from the central station.

I claim:

1. A radio transmission system designed to operate on a single defined frequency channel, comprising:
   a central receiver;
   at least one transmitter remote from the central receiver;
   a plurality of repeaters each adapted to receive a message transmitted thereto and to retransmit said message for receipt ultimately by said central receiver, said plurality of repeaters being located between said central receiver and said transmitter, each repeater having a respective unique identification address and memory means for storing a list of identification addresses corresponding to others of said repeaters which are within range thereof; and
   control means for causing at least one of said repeaters to retransmit said message to a repeater within range which corresponds to an identification address on said list and, in the event that said retransmitted message is not correctly received, for retransmitting said message again except to a further one of said repeaters corresponding to another identification address on said list.

2. A radio transmission system according to claim 1, wherein said identification addresses are arranged on said list in order of proximity of repeaters to said receiver.

3. A radio transmission system according to claim 1, wherein at least one of said repeaters includes logic means for analyzing a message received from another of said repeaters to detect an identification address forming part of said message and for retransmitting the message only after matching said detected respective identification address with said identification address of said at least one repeater.

4. A radio transmission system according to claim 1, wherein at least one of said repeaters includes detector means responsive to message data on said frequency channel for generating an inhibit signal, each of said repeaters being only able to retransmit said message in the absence of said inhibit signal.

5. A radio transmission system according to claim 1, wherein each one of said repeaters includes delay means for imposing a time delay between receipt of said message by said respective one of said repeaters and retransmission of said message by said respective one of said repeaters.

6. A radio transmission system according to claim 5, wherein said delay means provides a respective time delay that is associated with a respective one of said repeaters and is unique to that respective repeater, said delay means comprising respective time delay information stored in said memory means of said repeaters, respectively.

7. A radio transmission system according to claim 5, wherein the delay means includes means for randomly generating a time delay on receipt of said message by said respective one of said repeaters.

8. A radio transmission system according to claim 1, wherein each of said repeaters is located in a respective one of a plurality of zones which are spaced in succession further and further away from said receiver, and said respective unique identification address of each of said repeaters includes a zone address number that is indicative of the zone in which each of said repeaters is located.

9. A radio transmission system as in claim 8, wherein said respective zone address numbers are lower in value for zones closer to said receiver than for zones more distant from said receiver.

10. A radio transmission system according to claim 1, wherein each of said repeaters have a mains electrical supply, a standby battery, detector means for detecting mains electrical supply failure and means responsive to said detector means for transmitting a fail message to said receiver in the event of detection of mains electrical supply failure.

11. A radio transmission system designed to operate on a single defined frequency channel, comprising a central receiver, at least one transmitter remote from the central receiver and, located between said receiver and transmitter, a plurality of repeaters each adapted to receive a message from a transmitter or from another repeater and to re-transmit said message to the receiver either directly or via at least one other repeater, in which each repeater has a unique identification address, memory means storing a list of identification addresses relating to said repeaters within its range, and control means operative for causing the repeater to re-transmit said message to a first other of said repeaters corresponding to a first identification address on said list and, in the event that said re-transmitted message is not received or is incorrectly received by the first addressed repeater, to re-transmit said message again, but to a second other of said repeaters corresponding to a second identification address on said list.

12. A radio transmission system according to claim 11 wherein said identification addresses are arranged on said list in order of proximity of repeaters to said receiver.

13. A radio transmission system according to claim 11 wherein each repeater includes detector means responsive to message data on said frequency channel for generating an inhibit signal, each repeater being only able to re-transmit said message in the absence of said inhibit signal.

14. A radio transmission system according to claim 11 wherein each repeater includes delay means for imposing a time delay between receipt of said message by said repeater and re-transmission of said message by said repeater.

15. A radio transmission system according to claim 14 wherein the time delay associated with each repeater is unique to that repeater, and the delay means comprises time delay information stored in memory means of said repeater.

16. A radio transmission system according to claim 14 wherein the delay means includes means for randomly generating a time delay on receipt of said message.

17. A radio transmission system according to claim 11 wherein each of said repeaters is located in a respective one of a plurality of zones which are spaced in succession further and further away from said receiver, and said respective unique identification address of each of said repeaters includes a zone address number that is indicative of the zone in which each of said repeaters is located.

18. A radio transmission system according to claim 11 wherein each repeater has a mains electrical supply, a stand-by battery, detector means for detecting mains failure and means responsive to said detector means for transmitting a fail message to said receiver in the event of mains failure.

19. A radio transmission system according to claim 11 wherein each repeater includes logic means for analyzing a message received from another repeater to detect the identification address and to re-transmit the message only if said identification address corresponds to the identification address of the receiving repeater.

* * * * *